US012697271B1

(12) United States Patent
Zhao et al.

(10) Patent No.: US 12,697,271 B1
(45) Date of Patent: Aug. 4, 2026

(54) DOUBLE-GRIP MULTI-STAGE TELESCOPIC ADJUSTMENT MECHANISM

(71) Applicant: Dongguan Yishuo Electronic Technology Co., Ltd., Dongguan (CN)

(72) Inventors: Quan Zhao, Dongguan (CN); Shaoping Wan, Yueyang (CN)

( * ) Notice: Subject to any disclaimer, the term of this patent is extended or adjusted under 35 U.S.C. 154(b) by 0 days.

(21) Appl. No.: 19/421,512

(22) Filed: Dec. 16, 2025

Related U.S. Application Data

(63) Continuation-in-part of application No. 19/086,613, filed on Mar. 21, 2025, now abandoned.

(30) Foreign Application Priority Data

Mar. 13, 2025 (CN) ......................... 202520442576.7
Oct. 27, 2025 (CN) ......................... 202522264639.7

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0192* (2013.01); *A61H 2201/1215* (2013.01); *A61H 2201/1472* (2013.01); *A61H 2201/1669* (2013.01); *A61H 2201/1676* (2013.01)

(58) Field of Classification Search
CPC ........ A61H 19/00; A61H 19/32; A61H 19/34; A61H 19/40; A61H 19/44; A61H 19/50; A61H 23/0254; A61H 23/02; A61H 2201/0192; A61H 2201/1215; A61H 2201/1472; A61H 2201/1669
See application file for complete search history.

(56) References Cited

U.S. PATENT DOCUMENTS

| | | | | | |
|---|---|---|---|---|---|
| 10,272,011 | B1 * | 4/2019 | Sloan | ..................... | A61H 7/001 |
| 11,554,073 | B1 * | 1/2023 | Guo | ..................... | A61H 7/005 |
| 12,011,409 | B1 * | 6/2024 | Wang | ..................... | A61H 19/40 |
| 12,161,598 | B1 * | 12/2024 | Wang | ..................... | A61H 23/0263 |
| 12,178,773 | B1 * | 12/2024 | Wang | ..................... | A61H 19/44 |
| 12,208,053 | B1 * | 1/2025 | Liu | ..................... | A61H 23/006 |
| 12,285,377 | B1 * | 4/2025 | Lu | ..................... | A61H 23/02 |
| 12,370,122 | B1 * | 7/2025 | Cun | ..................... | A61H 19/32 |
| 12,447,094 | B1 * | 10/2025 | Huang | ..................... | A61H 9/0078 |
| 12,508,193 | B1 * | 12/2025 | Huang | ..................... | A61H 19/32 |
| 12,539,247 | B1 * | 2/2026 | Zhao | ..................... | A61H 7/007 |

(Continued)

*Primary Examiner* — Bradley H Philips
*Assistant Examiner* — Tyler A Raubenstraw

(57) ABSTRACT

A double-grip multi-stage telescopic adjustment mechanism includes two decorative covers, an outer housing is fixedly connected to adjacent side of each of two decorative covers, and a support sleeve column is fixedly connected to adjacent side of two outer housings; a key mechanism is installed on front side of the support sleeve column; a motion mechanism is installed on rear side of the support sleeve column, a biting vibration mechanism for reciprocating grasping is installed inside a bottom of two outer housings; the biting vibration mechanism includes a box body. The invention uses a reduction gearbox motor to provide driving force, which drives second circular plate to rotate. The second cylinder on second circular plate rotates accordingly and pushes the limit frame to slide along the support column. The limit rods on both sides of limit frame are embedded in grooves of left and right first swing arm sets.

13 Claims, 5 Drawing Sheets

(56) References Cited

U.S. PATENT DOCUMENTS

| | | | | |
|---|---|---|---|---|
| 2010/0125228 | A1* | 5/2010 | Yao | A61H 23/0254 601/111 |
| 2015/0164738 | A1* | 6/2015 | Caropelo | A61H 19/30 601/46 |
| 2015/0320636 | A1* | 11/2015 | Fine | A61H 19/44 600/38 |
| 2018/0049938 | A1* | 2/2018 | Fleming | A61H 7/001 |
| 2020/0253816 | A1* | 8/2020 | Sloan | G06N 3/0442 |
| 2022/0160577 | A1* | 5/2022 | Cai | A61H 23/0263 |
| 2022/0265504 | A1* | 8/2022 | Sloan | A61H 19/00 |
| 2022/0323290 | A1* | 10/2022 | Sloan | A61H 19/00 |
| 2024/0050307 | A1* | 2/2024 | Luo | A61H 19/44 |
| 2024/0252384 | A1* | 8/2024 | Zhou | A61H 7/008 |
| 2024/0325240 | A1* | 10/2024 | Zhang | A61H 23/0254 |
| 2025/0073116 | A1* | 3/2025 | Jin | A61H 19/32 |
| 2025/0090412 | A1* | 3/2025 | Chen | A61H 23/02 |
| 2025/0161147 | A1* | 5/2025 | Wang | A61H 7/007 |
| 2025/0161148 | A1* | 5/2025 | Wang | A61H 23/0254 |
| 2025/0161150 | A1* | 5/2025 | Wang | A61H 19/32 |
| 2025/0161151 | A1* | 5/2025 | Wang | A61H 23/0254 |
| 2025/0161152 | A1* | 5/2025 | Wang | A61H 7/007 |
| 2025/0195320 | A1* | 6/2025 | Tu | H02P 25/03 |
| 2025/0195324 | A1* | 6/2025 | Chen | A61H 23/0254 |
| 2025/0248889 | A1* | 8/2025 | Wang | A61H 19/44 |
| 2025/0255776 | A1* | 8/2025 | Wu | A61H 1/00 |
| 2025/0325440 | A1* | 10/2025 | Wang | A61H 19/44 |
| 2025/0332061 | A1* | 10/2025 | Wang | A61H 7/007 |
| 2026/0007567 | A1* | 1/2026 | Xu | A61H 19/32 |

* cited by examiner

DOUBLE-GRIP MULTI-STAGE TELESCOPIC ADJUSTMENT MECHANISM

TECHNICAL FIELD

The invention relates to the technical field of adult products, and specifically to a double-grip multi-stage telescopic adjustment mechanism.

BACKGROUND ART

Adult products refer to a category of products specially designed for adults to meet their physiological needs, provide emotional comfort, or enhance intimate experiences. Their usage scenarios and functions have a clear orientation towards adults and are not suitable for minors to access. The multi-stage telescopic adjustment function allows users to adjust the length and shape of the internal channel of a male masturbator according to their own preferences and sensitive points, thereby obtaining different levels of wrapping sensation and friction sensation. For example, when a stronger stimulation is desired, the mechanism can be adjusted to a specific stage to make the internal structure more compact and the stimulation stronger; when a milder experience is desired, it can be adjusted to other stages to change the internal space layout and bring a different feeling.

In the prior art, some male masturbators are difficult to achieve double-grip functionality. Users may feel that there is a lack of a sense similar to mutual interaction between two parties during use, resulting in insufficient richness and authenticity of the experience. To a certain extent, the double-grip structure can better adapt to the physical conditions and usage habits of different users, help fix the position of the male masturbator, and make it more stable during use. The lack of a double-grip structure will affect the stability of the male masturbator during use, requiring users to spend more energy to maintain its position. Especially for some people with special physical conditions or specific usage habits, this can easily affect the comfort and convenience of use.

SUMMARY OF THE INVENTION

Aiming at the deficiencies of the prior art, the invention provides a double-grip multi-stage telescopic adjustment mechanism, which solves the problem that some male masturbators in the prior art are difficult to achieve double-grip functionality.

To achieve the above purpose, the invention is realized through the following technical solutions: a double-grip multi-stage telescopic adjustment mechanism includes two decorative covers, an outer housing is fixedly connected to an adjacent side of each of two decorative covers, and a support sleeve column is fixedly connected to an adjacent side of two outer housings; a key mechanism is installed on a front side of the support sleeve column; a motion mechanism is installed on a rear side of the support sleeve column, a biting vibration mechanism for reciprocating grasping is installed inside a bottom of two outer housings;

the biting vibration mechanism includes a box body, a bottom of the box body is fixedly connected to inner walls of the bottom of two outer housings, a first reduction gearbox motor is fixedly connected to an interior of the box body, a second circular plate is fixedly connected to a driving end of the first reduction gearbox motor, a second cylinder is fixedly connected to a front side of the second circular plate; fixed shafts are fixedly connected to left and right sides of the interior of the box body, a first swing arm set is rotatably connected to an outside of the fixed shaft, a limit component for support is fixedly connected to the interior of the box body, an annular platform is fixedly connected to a top of the box body; a vibration motor is fixedly connected to an outside of one of the swing arm sets, a biting soft rubber is sleeved on an outside of the annular platform.

Preferably, the limit component includes two support columns, outside of two support columns is fixedly connected to the interior of the box body, and a limit frame is slidably connected to the outside of the two support columns, a limit rod is fixedly connected to an interior of front and rear sides of the limit frame, the limit rod is used to synchronously perform forward and backward movement while conducting opening and closing actions, and the size of the opening varies with the angle of the fixed shafts.

Preferably, the key mechanism includes a silicone key, a rear side of the silicone key is installed on a front side of two outer housings, a key decorative part is fixedly connected to a front side of the silicone key, a key light shield is fixedly connected to an outside of the key decorative part.

Preferably, the motion mechanism includes a stroking gearbox housing, a front side of the stroking gearbox housing is fixedly connected to the rear side of the support sleeve column; a 130 motor is fixedly connected to an inner wall of a right side of the stroking gearbox housing; a first auxiliary gear is rotatably connected to an interior of the stroking gearbox housing, a second auxiliary gear is rotatably connected to the interior of the stroking gearbox housing; an inner wall of the front side of the stroking gearbox housing is rotatably connected to a first circular plate, while a rear side of the first circular plate is fixedly connected to an oscillating gear, a gear gasket is fixedly connected to a rear side of the oscillating gear, a first cylinder is fixedly connected to a front side of the first circular plate.

Preferably, a plurality of sliding steel shafts are fixedly connected inside the support sleeve column, sliding sleeves are slidably connected to an outside of a plurality of sliding steel shafts; an outside of the sliding sleeves is fixed with an annular frame, and a stroking soft rubber is fixed inside the sliding sleeves.

Preferably, external teeth of the second auxiliary gear are in meshed connection with those of first auxiliary gear, and the external teeth of second auxiliary gear are also in meshed connection with those of the oscillating gear.

Preferably, a rear side of the gear gasket is rotatably connected to rear inner wall of the stroking gearbox housing, and an outside of the first cylinder is in contact with an outside of the annular frame.

Preferably, an outside of the second cylinder is in contact with an outside of the limit frame; an outside of the limit rod is slidably connected to an inside of first swing arm set.

Preferably, an outside of the vibration motor is in contact with an inside of the biting soft rubber, and an outside of the first swing arm set is also in contact with the inside of the biting soft rubber.

Preferably, the outside of the limit frame is slidably connected to an inside of the box body, and the outside of the annular platform is fixedly connected to bottom inner walls of two outer housings.

Preferably, the biting vibration mechanism further includes a main housing; a bottom of the main housing is fixedly connected to bottom inner walls of two outer housings; a second reduction gearbox motor is installed inside the main housing, and an eccentric transmission wheel is fixedly connected to a driving end of the second reduction gearbox motor; two limit shafts are fixedly connected inside the main housing, and a support frame is slidably connected to the inside of the main housing; two rotating shafts are rotatably connected inside the main housing, and a second swing arm set is rotatably connected to an outside of each rotating shaft; sliding columns are provided inside the second swing arm set.

Preferably, an outside of the sliding column is rotatably connected to an inside of the support frame; the inside of the support frame is slidably connected to outside of two limit shafts.

Preferably, an outside of the eccentric transmission wheel is in contact with an inner wall of the support frame; the rotating shaft is used to synchronously perform forward and backward movement while conducting opening and closing actions, and the size of the opening varies with the angle of the second swing arm set.

The invention provides a double-grip multi-stage telescopic adjustment mechanism and has the following beneficial effects:

1. The invention uses a reduction gearbox motor to provide driving force, which drives the second circular plate to rotate. The second cylinder on the second circular plate rotates accordingly and pushes the limit frame to slide along the support column. The limit rods on both sides of the limit frame are respectively embedded in grooves of left and right first swing arm sets. When the limit frame slides, it drives the first swing arm set to perform opening-and-closing reciprocating swings around the fixed shaft. The first swing arm set and the vibration motor squeeze and release the biting soft rubber outside the annular platform, making the biting soft rubber produce a clamping-like double-grip action and enhancing the fitting sense of contact.
2. After the 130 motor of the invention is started, its operation drives the oscillating gear to rotate through gear transmission, which in turn makes the first circular plate rotate synchronously. The first cylinder on the first circular plate performs circular motion with it, continuously forming periodic thrust on the annular frame, forcing the sliding sleeve to perform stable reciprocating linear motion along the sliding steel shaft. The stroking soft rubber inside the sliding sleeve moves synchronously with it, realizing telescopic actions with different strokes to simulate dynamic depth changes.

BRIEF DESCRIPTION OF ACCOMPANY DRAWINGS

Wherein: 1. decorative cover; 2. outer housing; 3. support sleeve column; 4. key mechanism; 41. silicone key; 42. key decorative part; 43. key light shield; 5. motion mechanism; 51. stroking gearbox housing; 52. 130 motor; 53. first auxiliary gear; 54. second auxiliary gear; 55. first circular plate; 56. oscillating gear; 57. gear gasket; 58. first cylinder; 59. sliding steel shaft; 510. sliding sleeve; 511. annular frame; 512. stroking soft rubber; 6. biting vibration mechanism; 61. box body; 62. first reduction gearbox motor; 63. second circular plate; 64. second cylinder; 65. fixed shaft; 66. first swing arm set; 67. support column; 68. limit frame; 69. limit rod; 610. vibration motor; 611. annular platform; 612. biting soft rubber; 613. limit component; 614. main housing; 615. second reduction gearbox motor; 616. eccentric transmission wheel; 617. limit shaft; 618. support frame; 619. rotating shaft; 620. sliding column; 621. second swing arm set.

Specific Embodiment of the Invention

The following will clearly and completely describe the technical solutions in the embodiments of the invention with reference to the accompanying drawings in the specification of the invention. Obviously, the described embodiments are only a part of the embodiments of the invention, not all of them. Based on the embodiments of the invention, all other embodiments obtained by those of ordinary skill in the art without making creative work shall fall within the protection scope of the invention.

Figure 1:
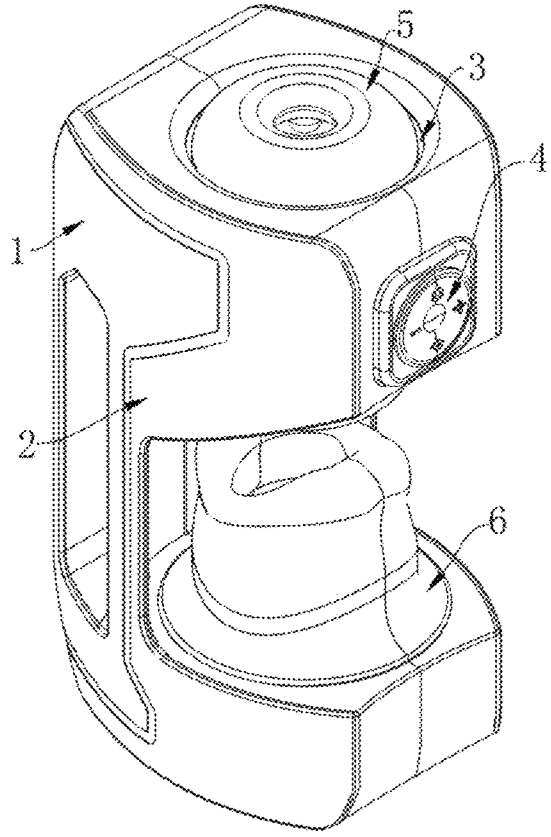
FIG. 1 is a perspective view of the invention.
Figure 2:
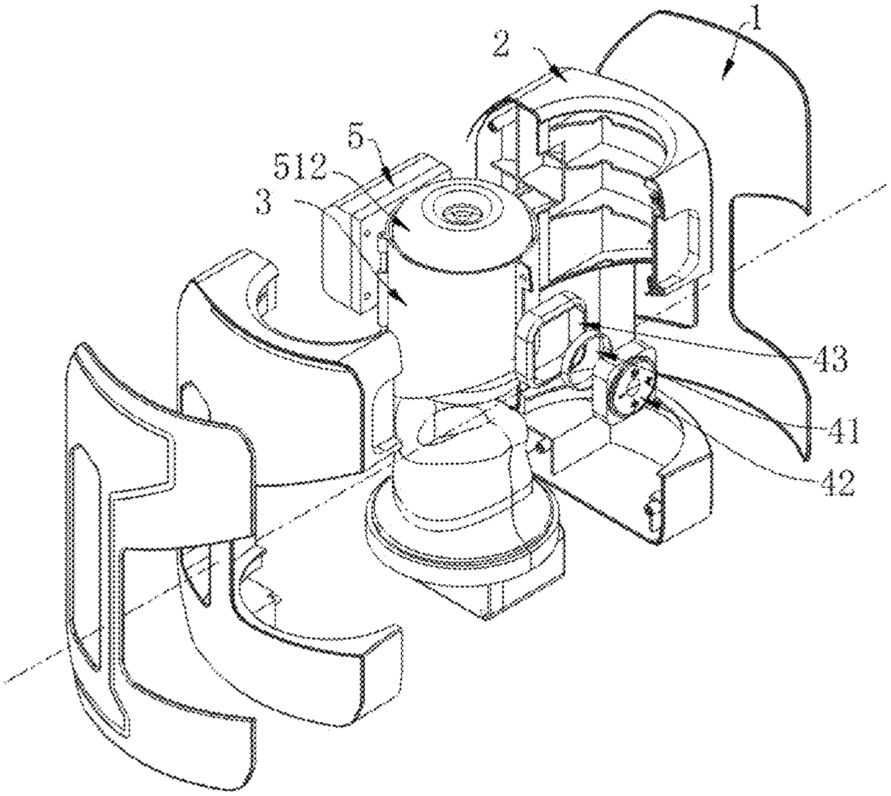
FIG. 2 is a schematic diagram of the housing structure of the invention.

Please refer to FIG. 1 and FIG. 2. An embodiment of the invention provides a double-grip multi-stage telescopic adjustment mechanism, which includes two decorative covers 1. The decorative covers 1 serve as external protection and decorative components of the mechanism, which can completely cover a gap at a joint of two outer housings 2, prevent external dust, water vapor, and small impurities from entering an interior of the mechanism and eroding parts. At the same time, they unify the appearance style of the mechanism, avoid the internal structure from being exposed and affecting the appearance, and can also buffer the impact force to protect the internal outer housings 2 when the mechanism is slightly collided by external forces; an outer housing 2 is fixedly connected to an adjacent side of each of two decorative covers 1, and a support sleeve column 3 is fixedly connected to an adjacent side of two outer housings 2; a plurality of mounting holes need to be processed inside the support sleeve column 3 to fix sliding steel shafts 59, which provide guiding support for the reciprocating sliding of sliding sleeves 510 in a motion mechanism 5, and ensure the linearity and stability of the telescopic movement; a key mechanism 4 is installed on a front side of the support sleeve column 3. The key mechanism 4 is a core interaction module for users to control the mechanism. It needs to trigger the on-off of the internal circuit through the pressing action of a silicone key 41, convert the user's operation instructions into electrical signals and transmit them to a control unit, and then the control unit adjusts the operating parameters of the motion mechanism 5 and a biting vibration mechanism 6 according to the signals; the motion mechanism 5 is installed on a rear side of the support sleeve column 3. The motion mechanism 5 is a core execution module for realizing the multi-stage telescopic function of the mechanism. It uses a 130 motor 52 to output power, changes the rotation speed and torque through the transmission of a gear set, drives a first circular plate 55 to rotate, and then converts the rotational motion into the reciprocating linear motion of the sliding sleeve 510 along the sli ding steel shaft 59. With the multi-stage limit design of the sliding steel shaft 59, the switching of different telescopic strokes is realized to meet the mechanism's demand for simulating dynamic depth changes; the biting vibration mechanism 6 for reciprocating grasping is installed inside bottom of two outer housings 2. The biting vibration mechanism 6 uses a first reduction gearbox motor 62 to provide continuous and stable power, drives a first swing arm set 66 to perform opening and closing reciprocating motion through a transmission component, and then the first swing arm set 66 squeezes a biting soft rubber 612 on an annular platform 611, making the biting soft rubber 612 produce a clamping action, enhancing the fit between the mechanism and the contacted object, and ensuring the reliability and stability of the grasping action.

Figure 3:
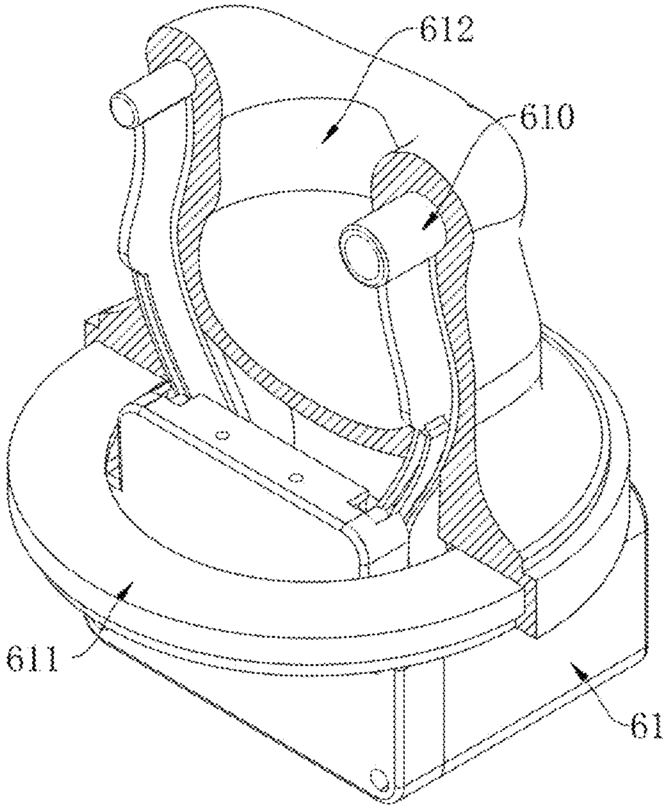
FIG. 3 is a schematic diagram of the annular platform structure of the invention.
Figure 4:
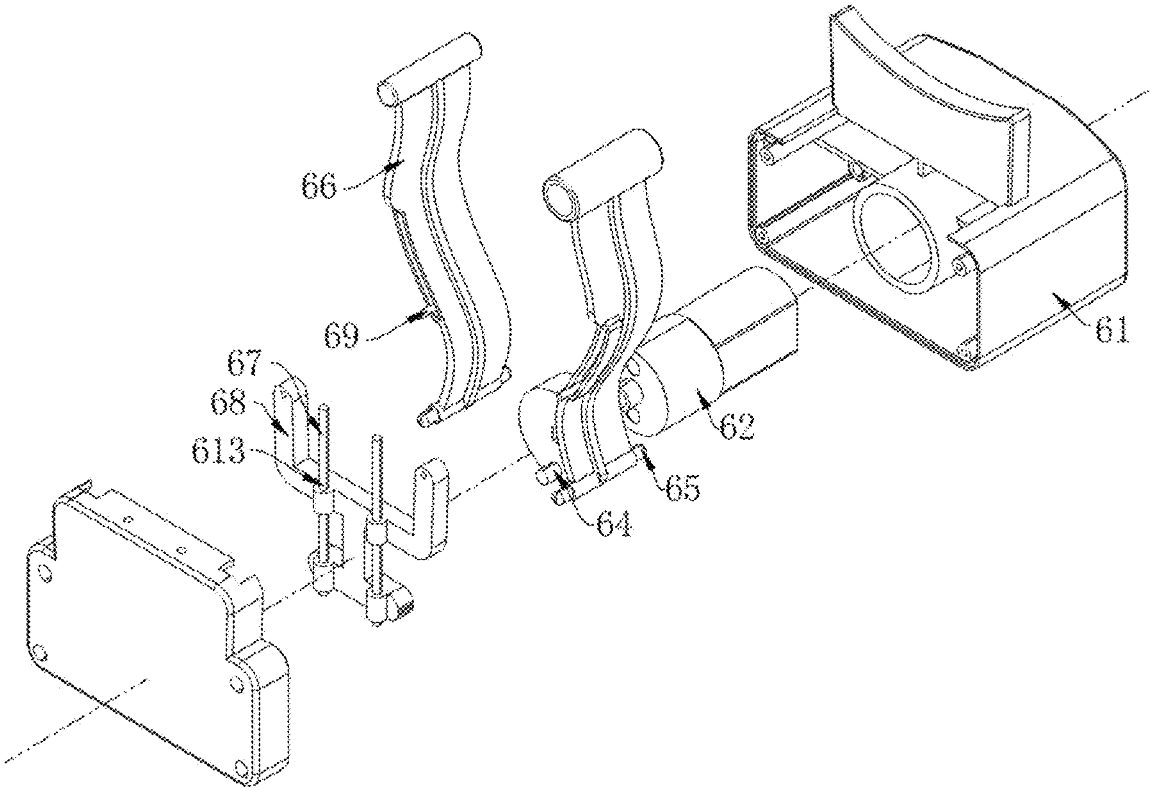
FIG. 4 is a schematic diagram of an interior of the box body of the invention.
Figure 5:
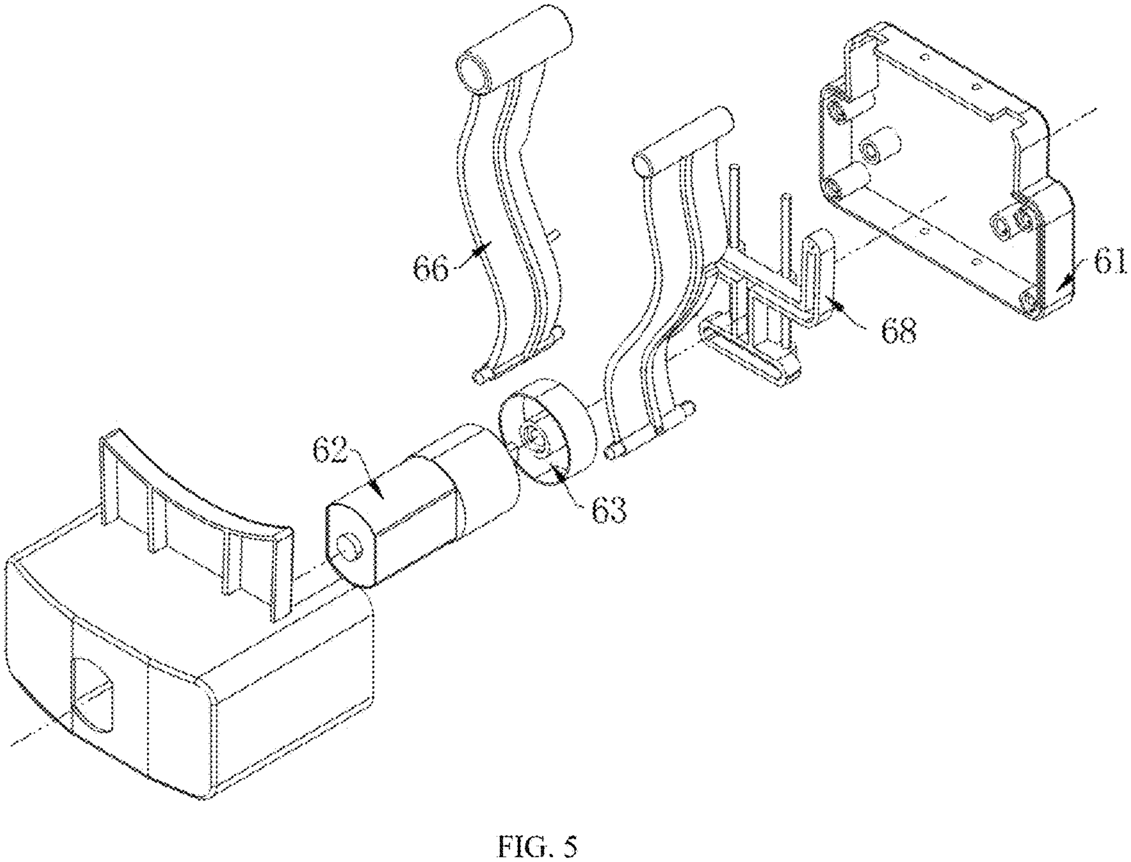
FIG. 5 is an exploded view of the box body structure of the invention.

Please refer to FIG. 3 to FIG. 5. The biting vibration mechanism 6 includes a box body 61, a bottom of the box body 61 is fixedly connected to inner walls of the bottom of two outer housings 2, the first reduction gearbox motor 62 is fixedly connected to an interior of the box body 61. The first reduction gearbox motor 62 is the power source of the biting vibration mechanism 6, its built-in reduction gear set can convert high rotation speed and low torque into low rotation speed and high torque, providing sufficient driving force for the biting action, ensuring that the first swing arm set 66 can drive the biting soft rubber 612 to generate stable clamping force. At the same time, the motor can adjust the rotation speed according to the control signal to change the frequency and strength of the biting action; a second circular plate 63 is fixedly connected to a driving end of the first reduction gearbox motor 62, the second circular plate 63 is the first key component for power transmission of the first reduction gearbox motor 62, which is rigidly connected to a driving end of the motor through a central hole, completely transmitting the rotational motion of the motor to itself, and then using a second cylinder 64 fixed on a front side to convert the rotational motion into power for pushing a limit frame 68 to slide, ensuring no loss of power transmission. At the same time, the planar structure of the second circular plate 63 can ensure the stability of the movement trajectory of the second cylinder 64; the second cylinder 64 is fixedly connected to a front side of the second circular plate 63. The second cylinder 64 is vertically fixed at an edge of a front side of the second circular plate 63, and performs circular motion when rotating with the second circular plate 63. During the movement, its outer wall continuously contacts the limit frame 68 and applies thrust, converting the circular motion into the linear motion of the limit frame 68 along a support column 67. The cylindrical structure of the second cylinder 64 can reduce the friction when contacting the limit frame 68, ensuring a smooth pushing process and avoiding jamming; fixed shafts 65 are fixedly connected to left and right sides of an interior of the box body 61. The fixed shafts 65 are the rotating support shafts of the first swing arm set 66, and their two ends are respectively fixed in fixed holes on left and right inner walls of the box body 61, so that the first swing arm set 66 always rotates around the fixed shafts 65 during the opening and closing process without deviation or shaking.

Figure 8:
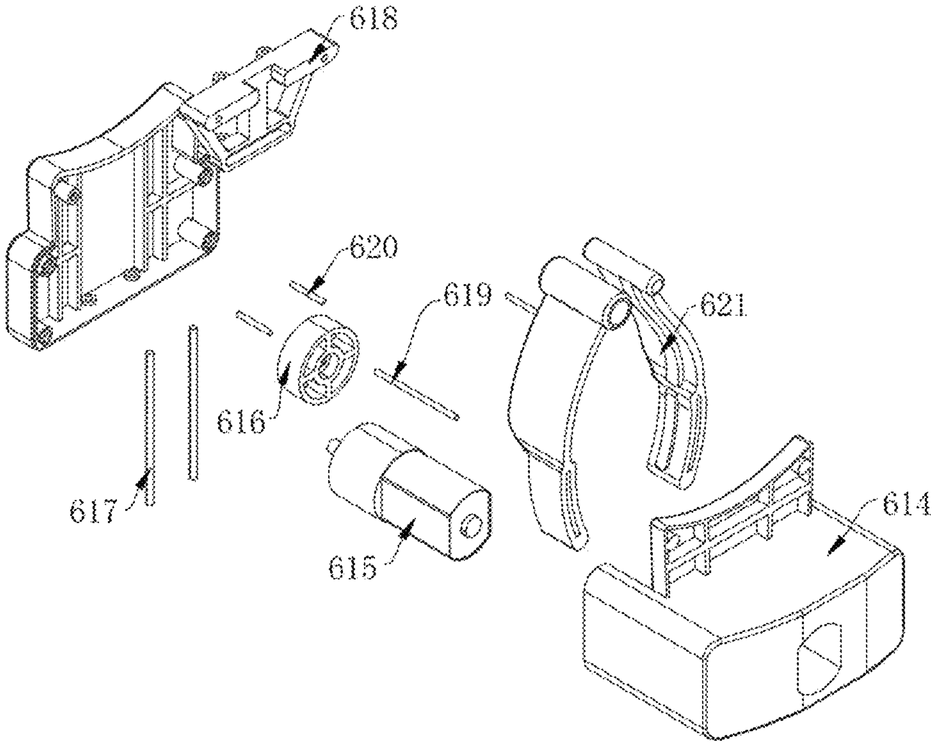
FIG. 8 is a schematic diagram of the structure of the first reduction gearbox motor of the invention.

Please refer to FIG. 8. the first swing arm set 66 is rotatably connected to an outside of a fixed shaft 65. The first swing arm set 66 is a direct execution component of the biting action, with an end thereof rotatably connected to the fixed shaft 65 through a shaft hole, and an other end extends to an inner side of the biting soft rubber 612; driven by the limit frame 68, the first swing arm set 66 swings back and forth around the fixed shaft 65, during the swinging process, it squeezes or releases the biting soft rubber 612 together with a vibration motor 610 through its outer wall, causing the biting soft rubber 612 to deform and realize clamping. At the same time, the length and swing angle of the first swing arm set 66 need to be accurately designed to ensure that the clamping range of the biting soft rubber 612 meets the requirements; a limit component 613 for support is fixedly connected to the interior of the box body 61. The limit component 613 is the core of the transmission connection of the biting vibration mechanism 6, and is composed of support columns 67, a limit frame 68, and a limit rod 69. The support columns 67 provides sliding guidance for the limit frame 68 to prevent the limit frame 68 from deviating when sliding. The limit frame 68 receives the thrust of the second cylinder 64 and transmits it to the limit rod 69. The limit rod 69 then converts the linear motion into the rotational motion of the first swing arm set 66, ensuring a stable and efficient transmission path of power from the motor to the first swing arm set 66; the annular platform 611 is fixedly connected to a top of the box body 61. The annular platform 611 is the installation and support base of the biting soft rubber 612, and its outer wall needs to be closely attached to an inner wall of the biting soft rubber 612 to ensure that the biting soft rubber 612 does not shift after being fixed. At the same time, the annular structure of the annular platform 611 can provide uniform supporting force for the biting soft rubber 612, so that when the biting soft rubber 612 is squeezed by the first swing arm set 66, it can deform uniformly along the annular trajectory, ensuring the symmetry and stability of the clamping action; the vibration motor 610 is fixedly connected to an outside of one of the swing arm sets 66. The vibration motor 610 is sleeved at a specific position of the first swing arm set 66. Its main function is to increase the contact area between the first swing arm set 66 and the biting soft rubber 612, avoid local excessive wear of the soft rubber caused by the single-point contact between the first swing arm set 66 and the biting soft rubber 612, and at the same time make the squeezing force of the first swing arm set 66 on the biting soft rubber 612 evenly distributed, ensuring consistent deformation of the biting soft rubber 612 and improving the fit and reliability of clamping.

The biting soft rubber 612 is sleeved on an outside of the annular platform 611. The biting soft rubber 612 is made of elastic material and is a component that directly contacts the clamped object. It realizes the clamping action through its own elastic deformation, which can not only avoid damage to the object caused by rigid clamping, but also fill the tiny depressions on the surface of the object through deformation, enhancing the contact fit. At the same time, the soft rubber material has a certain wear resistance, which can extend the service life of the clamping component and ensure stable clamping performance after long-term use; the limit component 613 includes two support columns 67. The support columns 67 are vertically fixed on an inner wall of the bottom of the box body 61. The two support columns 67 are arranged in parallel, and their spacing matches the width of the limit frame 68, their outer walls need to be smoothly treated to reduce the frictional resistance with an inner wall of the limit frame 68, ensuring that the limit frame 68 can slide smoothly along the support columns 67. At the same time, the support columns 67 need to have sufficient rigidity to prevent bending or deformation during the pushing process of the limit frame 68; outside of two support columns 67 is fixedly connected to the interior of the box body 61, and the limit frame 68 is slidably connected to the outside of the two support columns 67. The limit frame 68 is the core transmission component of the limit component 613, sliding holes matching the support columns 67 is processed inside the limit frame 68, which can slide linearly along the support columns 67; a front side contacts the second cylinder 64 to receive thrust, and two sides are connected to the first swing arm set 66 through fixed limit rods 69, which can convert its own linear motion into the rotational motion of the first swing arm set 66; the limit rod 69 is fixedly connected to an interior of front and rear sides of the limit frame 68. The limit rod 69 is a cylindrical structure, with two ends respectively fixed on the front and rear sides of the limit frame 68, and a middle part embedded in a sliding groove of the first swing arm set 66, its function is to establish a transmission connection between the limit frame 68 and the first swing arm set 66. When the limit frame 68 slides, the limit rod 69 slides in the sliding groove of the first swing arm set 66 and drive the first swing arm set 66 to rotate around the fixed shaft 65.

Please refer to FIG. 1 and FIG. 2. The key mechanism 4 includes the silicone key 41, a rear side of the silicone key 41 is installed on a front side of two outer housings 2, a key decorative part 42 is fixedly connected to a front side of the silicone key 41. The key decorative part 42 covers front surface of the silicone key 41 and is made of hard material. On the one hand, the key decorative part 42 can protect the silicone key 41 from external scratches and impact damage, and extend the service life of the silicone key 41; on the other hand, it can clearly identify the key function through surface printing or engraving, facilitating user recognition and operation; a key light shield 43 is fixedly connected to an outside of the key decorative part 42. The key light shield 43 has an annular structure, which can ensure that the user can clearly identify the key, accurately complete the pressing operation, and ensure the stability of instruction input.

Figure 6:
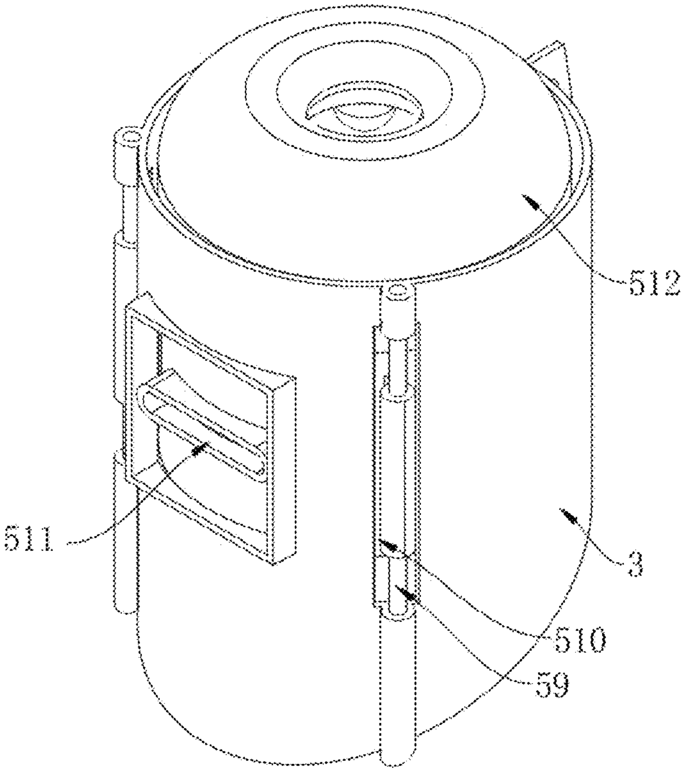
FIG. 6 is a schematic diagram of the annular frame of the invention.
Figure 7:
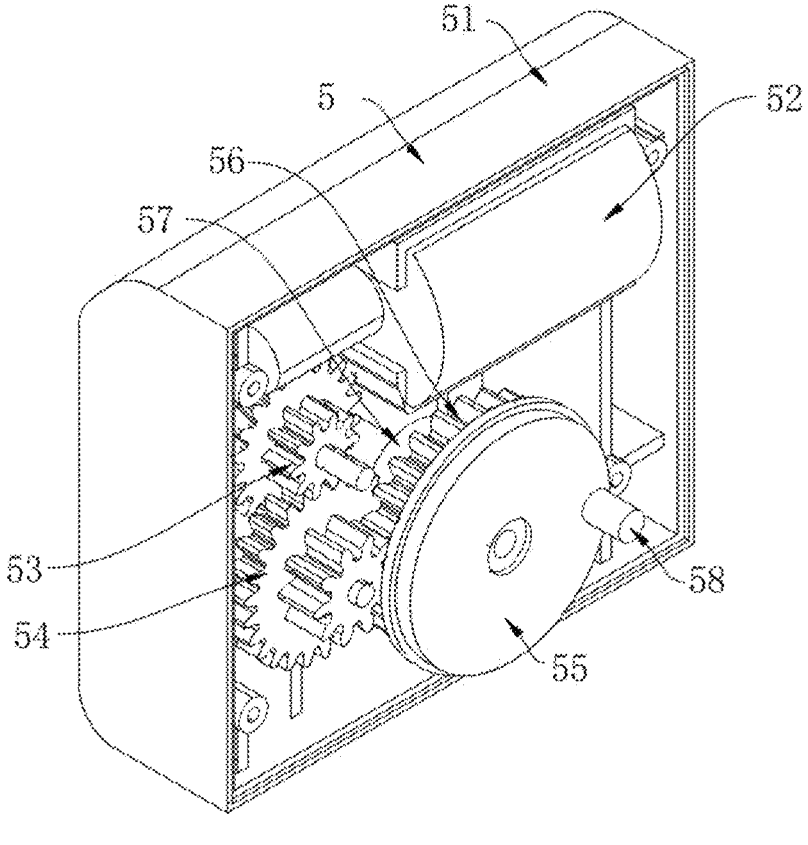
FIG. 7 is a schematic diagram of the internal structure of the stroking gearbox housing of the invention.

Please refer to FIG. 2, FIG. 6, and FIG. 7. The motion mechanism 5 includes a stroking gearbox housing 51, a front side of the stroking gearbox housing 51 is fixedly connected to the rear side of the support sleeve column 3; the 130 motor 52 is fixedly connected to an inner wall of a right side of the stroking gearbox housing 51. The 130 motor 52 is the power source of the motion mechanism 5, which can adjust the output rotation speed and direction according to the signal of the control unit, providing continuous power for the gear set transmission; its output shaft is rigidly connected to a first auxiliary gear 53, which can directly transmit the rotational power to the first auxiliary gear 53, ensuring efficient power transmission without obvious loss; a first auxiliary gear 53 is rotatably connected to an interior of the stroking gearbox housing 51. The first auxiliary gear 53 is a first-stage transmission gear of the motion mechanism 5. Its number of teeth and modulus are accurately designed, after being fixedly connected to an output shaft of the 130 motor 52, it can convert the high rotation speed of the motor into a rotation speed suitable for the second auxiliary gear 54, and at the same time change the direction of power transmission, so that the power can be smoothly transmitted to the second auxiliary gear 54; a second auxiliary gear 54 is rotatably connected to the interior of the stroking gearbox housing 51. The second auxiliary gear 54 is the second-stage transmission gear of the motion mechanism 5. It has more teeth than the first auxiliary gear 53, which can further reduce the transmission rotation speed and increase the torque. At the same time, the second auxiliary gear 54 meshes with the first auxiliary gear 53 and the oscillating gear 56 respectively, playing the role of power transfer, and accurately transmitting the power transmitted by the first auxiliary gear 53 to the oscillating gear 56; an inner wall of the front side of the stroking gearbox housing 51 is rotatably connected to the first circular plate 55, while a rear side thereof is fixedly connected to the oscillating gear 56 and rotates synchronously with the oscillating gear 56; a first cylinder 58 fixed at an edge of front side performs circular motion with it, which can convert the rotational motion of the oscillating gear 56 into periodic thrust on the annular frame 511. At the same time, the flatness of the first circular plate 55 needs to be strictly controlled to ensure that the movement trajectory of the first cylinder 58 is a standard circle, avoiding uneven thrust leading to jamming of the sliding sleeve 510; the oscillating gear 56 is fixedly connected to a rear side of first circular plate 55. As a terminal transmission gear of the motion mechanism 5, the oscillating gear 56 meshes with second auxiliary gear 54 to receive power, and its number of teeth matches that of second auxiliary gear 54, ensuring stable reception of power transmitted by second auxiliary gear 54 and driving first circular plate 55 to rotate. Meanwhile, a rear side of the oscillating gear 56 is in contact with a gear gasket 57, which reduces friction between the oscillating gear 56 and an inner wall of the stroking gearbox housing 51 during rotation, ensuring smooth rotation and preventing power loss or component overheating caused by excessive friction. The gear gasket 57 is fixedly connected to the rear side of the oscillating gear 56, extending the service life of both the oscillating gear 56 and the housing.

The first cylinder 58 is fixedly connected to a front side of the first circular plate 55; vertically fixed at an edge of the first circular plate 55's front side, the first cylinder 58 performs circular motion with the first circular plate 55; during this motion, its outer wall continuously contacts an inner side of the annular frame 511, applying periodic pushing and pulling forces to the annular frame 511, which pushes the annular frame 511 to drive the sliding sleeve 510 into reciprocating motion along the sliding steel shafts 59; an outer wall of the first cylinder 58 must be smooth to reduce frictional resistance during contact with the annular frame 511, ensuring stable transmission of pushing force; a plurality of sliding steel shafts 59 are fixedly connected inside the support sleeve column 3. Serving as sliding guide components for the sliding sleeve 510, these sliding steel shafts 59 are made of high-precision linear optical axes with a high surface smoothness. Arranged in parallel and evenly distributed inside the support sleeve column 3, a plurality of sliding steel shafts 59 not only provide a linear sliding track for the sliding sleeve 510 and restrict its movement direction but also realize multi-stage stroke limiting by means of limiting protrusions set at specific positions on shaft body, which allows the sliding sleeve 510 to reciprocate within different stroke ranges, meeting the mechanism's requirement for multi-stage telescoping; the sliding sleeves 510 are slidably connected to an outside of a plurality of sliding steel shafts 59. As a telescopic execution component of the motion mechanism 5, the sliding sleeves 510 are internally processed with sliding holes matching the sliding steel shafts 59, enabling smooth sliding along the sliding steel shafts 59, while an outside of the sliding sleeve 510 is fixed with the annular frame 511 to receive the pushing force from the first cylinder 58, and a stroking soft rubber 512 is fixed inside it-allowing the sliding sleeves 510 to drive the stroking soft rubber 512 into synchronous reciprocating linear motion. The annular frame 511, an annular structure, is sleeved outside the sliding sleeve 510 and rigidly connected to it, its inner side contacts the first cylinder 58, enabling uniform transmission of the periodic pushing force from the first cylinder 58 to the sliding sleeve 510 and driving the sliding sleeve 510 to slide along the sliding steel shafts 59. The stroking soft rubber 512, made of soft elastic material, is fixed inside the sliding sleeve 510 and moves synchronously with it in a reciprocating manner, functioning to directly contact the object it interacts with; external teeth of the second auxiliary gear 54 are in meshed connection with those of first auxiliary gear 53, and the external teeth of second auxiliary gear 54 are also in meshed connection with those of the oscillating gear 56; a rear side of the gear gasket 57 is rotatably connected to rear inner wall of the stroking gearbox housing 51, and an outside of the first cylinder 58 is in contact with an outside of the annular frame 511.

An outside of the second cylinder 64 is in contact with an outside of the limit frame 68; an outside of the limit rod 69 is slidably connected to an inside of first swing arm set 66; an outside of the vibration motor 610 is in contact with an inside of the biting soft rubber 612, and an outside of the first swing arm set 66 is also in contact with the inside of the biting soft rubber 612; the outside of the limit frame 68 is slidably connected to an inside of the box body 61, and the outside of the annular platform 611 is fixedly connected to bottom inner walls of two outer housings 2.

Please refer to FIG. 8. The biting vibration mechanism 6 further includes a main housing 614; a bottom of the main housing 614 is fixedly connected to bottom inner walls of two outer housings 2; a second reduction gearbox motor 615 is installed inside the main housing 614, and an eccentric transmission wheel 616 is fixedly connected to a driving end of the second reduction gearbox motor 615; two limit shafts 617 are fixedly connected inside the main housing 614, and a support frame 618 is slidably connected to an inside of the main housing 614; two rotating shafts 619 are rotatably connected inside the main housing 614, and a second swing arm set 621 is rotatably connected to an outside of each rotating shaft 619; sliding columns 620 are provided inside the second swing arm set 621, and an outside of the sliding column 620 is rotatably connected to an inside of the support frame 618; the inside of the support frame 618 is slidably connected to outside of two limit shafts 617, and an outside of the eccentric transmission wheel 616 is in contact with an inner wall of the support frame 618. The rotating shaft 619 is used to synchronously perform forward and backward movement while conducting opening and closing actions, and the size of the opening varies with the angle of the second swing arm set 621.

Working principle: when the 130 motor 52 in the motion mechanism 5 is activated, its operation drives the oscillating gear 56 to rotate through gear transmission, which in turn causes first circular plate 55 to rotate synchronously, the first cylinder 58 on the first circular plate 55 performs circular motion with it, continuously applying periodic pushing force to the annular frame 511. This forces the sliding sleeve 510 to perform stable reciprocating linear motion along the sliding steel shafts 59, while the stroking soft rubber 512 inside the sliding sleeve 510 moves synchronously with it. This realizes telescopic movements with different strokes, thereby simulating dynamic depth changes.

In the biting vibration mechanism 6: the first reduction gearbox motor 62 provides driving force to drive the second circular plate 63 to rotate, the second cylinder 64 on the second circular plate 63 rotates accordingly and pushes the limit frame 68 to slide along the support columns 67. The limit rods 69 on both sides of the limit frame 68 are respectively embedded in grooves of left and right first swing arm set 66. When the limit frame 68 slides, it drives first swing arm set 66 to perform opening-and-closing reciprocating swings around the fixed shafts 65; the first swing arm set 66 and the vibration motor 610 squeeze and release the biting soft rubber 612 outside the annular platform 611, causing the biting soft rubber 612 to produce a clamping-like double-grip action and enhancing the fit of contact.

In the key mechanism 4: the silicone key 41 serves as an operation interface. When pressed, it triggers an internal circuit signal, which is transmitted to control units of the motion mechanism 5 and the biting vibration mechanism 6. This further adjusts the rotation speed and direction of the 130 motor 52 and the first reduction gearbox motor 62. By changing the motor parameters, the telescopic frequency and amplitude of the stroking soft rubber 512, as well as the biting force and rhythm of the biting soft rubber 612, can be precisely controlled. The key light shield 43 reduces interference from external light on key operations, ensuring stable command input.

In another embodiment of the biting vibration mechanism 6: the second reduction gearbox motor 615 provides driving force to drive the eccentric transmission wheel 616 to rotate. The eccentric transmission wheel 616 rotates and pushes the support frame 618 to slide along the limit shafts 617. The sliding columns 620 on both sides of the limit shafts 617 are respectively embedded in grooves of left and right second swing arm set 621. When the support frame 618 slides, it drives the left and right second swing arm set 621 to perform opening-and-closing reciprocating swings around the sliding columns 620. second swing arm set 621 and the vibration motor 610 squeeze and release the biting soft rubber 612 outside the annular platform 611, causing the biting soft rubber 612 to produce a clamping double-grip action. The second reduction gearbox motor 615 drives the eccentric transmission wheel 616, which pushes a sliding block to drive the left and right second swing arm set 621-forming a mechanism that moves back and forth. While moving back and forth, the second swing arm set 621 is used to synchronously perform forward and backward movement while conducting opening and closing actions, and the size of the opening varies with the angle of the second swing arm set 621.

Although the embodiments of the invention have been shown and described, for those of ordinary skill in the art, it is understood that various changes, modifications, substitutions, and variations can be made to these embodiments without departing from the principle and spirit of the invention. The scope of the invention is defined by the appended claims and their equivalents.

The invention claimed is:

1. A double-grip multi-stage telescopic adjustment mechanism, including two decorative covers, an outer housing is fixedly connected to an adjacent side of each of two decorative covers, and a support sleeve column is fixedly connected to an adjacent side of two outer housings; a key mechanism is installed on a front side of the support sleeve column; a motion mechanism is installed on a rear side of the support sleeve column, a biting vibration mechanism for reciprocating grasping is installed inside a bottom of two outer housings;

the biting vibration mechanism includes a box body, a bottom of the box body is fixedly connected to inner walls of the bottom of two outer housings, a first reduction gearbox motor is fixedly connected to an interior of the box body, a second circular plate is fixedly connected to a driving end of the first reduction gearbox motor, a second cylinder is fixedly connected to a front side of the second circular plate; fixed shafts are fixedly connected to left and right sides of the interior of the box body, a first swing arm set is rotatably connected to an outside of the fixed shaft, a limit component for support is fixedly connected to the interior of the box body, an annular platform is fixedly connected to a top of the box body; a vibration motor is fixedly connected to an outside of one of the swing arm sets, a biting soft rubber is sleeved on an outside of the annular platform, and the first reduction gearbox motor drives the second circular plate.

2. The double-grip multi-stage telescopic adjustment mechanism according to claim 1, wherein the limit component includes two support columns, outside of two support columns is fixedly connected to the interior of the box body, and a limit frame is slidably connected to the outside of the two support columns, a limit rod is fixedly connected to an interior of front and rear sides of the limit frame.

3. The double-grip multi-stage telescopic adjustment mechanism according to claim 1, wherein the key mechanism includes a silicone key, a rear side of the silicone key is installed on a front side of two outer housings, a key decorative part is fixedly connected to a front side of the silicone key, a key light shield is fixedly connected to an outside of the key decorative part.

4. The double-grip multi-stage telescopic adjustment mechanism according to claim 1, wherein the motion mechanism includes a stroking gearbox housing, a front side of the stroking gearbox housing is fixedly connected to the rear side of the support sleeve column; a motor is fixedly connected to an inner wall of a right side of the stroking gearbox housing; a first auxiliary gear is rotatably connected to an interior of the stroking gearbox housing, a second auxiliary gear is rotatably connected to the interior of the stroking gearbox housing; an inner wall of the front side of the stroking gearbox housing is rotatably connected to a first circular plate, while a rear side of the first circular plate is fixedly connected to an oscillating gear, a gear gasket is fixedly connected to a rear side of the oscillating gear, a first cylinder is fixedly connected to a front side of the first circular plate.

5. The double-grip multi-stage telescopic adjustment mechanism according to claim 4, wherein a plurality of sliding steel shafts are fixedly connected inside the support sleeve column, sliding sleeves are slidably connected to an outside of a plurality of sliding steel shafts; an outside of the sliding sleeves is fixed with an annular frame, and a stroking soft rubber is fixed inside the sliding sleeves.

6. The double-grip multi-stage telescopic adjustment mechanism according to claim 4, wherein external teeth of the second auxiliary gear are in meshed connection with those of first auxiliary gear, and the external teeth of second auxiliary gear are also in meshed connection with those of the oscillating gear.

7. The double-grip multi-stage telescopic adjustment mechanism according to claim 5, wherein a rear side of the gear gasket is rotatably connected to rear inner wall of the stroking gearbox housing, and an outside of the first cylinder is in contact with an outside of the annular frame.

8. The double-grip multi-stage telescopic adjustment mechanism according to claim 1, wherein an outside of the second cylinder is in contact with an outside of the limit frame; an outside of the limit rod is slidably connected to an inside of first swing arm set.

9. The double-grip multi-stage telescopic adjustment mechanism according to claim 1, wherein an outside of the vibration motor is in contact with an inside of the biting soft rubber, and an outside of the first swing arm set is also in contact with the inside of the biting soft rubber.

10. The double-grip multi-stage telescopic adjustment mechanism according to claim 1, wherein the outside of the limit frame is slidably connected to an inside of the box body, and the outside of the annular platform is fixedly connected to bottom inner walls of two outer housings.

11. The double-grip multi-stage telescopic adjustment mechanism according to claim 1, wherein the biting vibration mechanism further includes a main housing; a bottom of the main housing is fixedly connected to bottom inner walls of two outer housings; a second reduction gearbox motor is installed inside the main housing, and an eccentric transmission wheel is fixedly connected to a driving end of the second reduction gearbox motor; two limit shafts are fixedly connected inside the main housing, and a support frame is slidably connected to the inside of the main housing; two rotating shafts are rotatably connected inside the main housing, and a second swing arm set is rotatably connected to an outside of each rotating shaft; sliding columns are provided inside the second swing arm set.

12. The double-grip multi-stage telescopic adjustment mechanism according to claim 11, wherein an outside of the sliding column is rotatably connected to an inside of the support frame; the inside of the support frame is slidably connected to outside of two limit shafts.

13. The double-grip multi-stage telescopic adjustment mechanism according to claim 11, wherein an outside of the eccentric transmission wheel is in contact with an inner wall of the support frame; the rotating shaft is used to synchronously perform forward and backward movement while conducting opening and closing actions, and the size of the opening varies with the angle of the second swing arm set.

* * * * *